(12) United States Patent
Marín et al.

(10) Patent No.: US 11,385,378 B2
(45) Date of Patent: Jul. 12, 2022

(54) METHOD FOR SECURITY INSPECTION AND KIT OF PARTS WITH A DETACHABLE SINGLE-USE INLAY FOR AN X-RAY TRAY

(71) Applicants: Saray González Marín, Hofheim am Taunus (DE); Eckhard Edelbert Melz, Hofheim am Taunus (DE)

(72) Inventors: Saray González Marín, Hofheim am Taunus (DE); Eckhard Edelbert Melz, Hofheim am Taunus (DE)

( * ) Notice: Subject to any disclaimer, the term of this patent is extended or adjusted under 35 U.S.C. 154(b) by 0 days.

(21) Appl. No.: 17/025,828

(22) Filed: Sep. 18, 2020

(65) Prior Publication Data

US 2021/0003516 A1      Jan. 7, 2021

Related U.S. Application Data

(63) Continuation of application No. 16/153,503, filed on Oct. 5, 2018, now Pat. No. 10,794,842.

(51) Int. Cl.
*G01V 5/00* (2006.01)
*G01N 23/04* (2018.01)
*B65D 25/02* (2006.01)

(52) U.S. Cl.
CPC ........... *G01V 5/0075* (2013.01); *B65D 25/02* (2013.01); *G01N 23/04* (2013.01); *G01V 5/0008* (2013.01); *G01N 2223/318* (2013.01)

(58) Field of Classification Search
CPC .. G01N 23/04; G01N 2223/318; B65D 25/02; G01V 5/0008
See application file for complete search history.

(56) References Cited

U.S. PATENT DOCUMENTS

| | | | |
|---|---|---|---|
| 2005/0193648 A1* | 9/2005 | Klein | B64F 1/368 52/174 |
| 2007/0132580 A1 | 6/2007 | Ambrefe, Jr. | |
| 2012/0074149 A1* | 3/2012 | Roth | B65D 25/16 220/495.01 |
| 2017/0000115 A1* | 1/2017 | Nassar | C08G 65/33303 |

FOREIGN PATENT DOCUMENTS

WO     2015/041619 A1     3/2015

* cited by examiner

*Primary Examiner* — Hugh Maupin
(74) *Attorney, Agent, or Firm* — Seed Intellectual Property Law Group LLP

(57) ABSTRACT

This disclosure relates to a method for security inspection of baggage and/or personal items. This disclosure also relates to a kit of parts with a detachable single-use inlay and an X-ray tray of a security check at an airport.

20 Claims, 5 Drawing Sheets

METHOD FOR SECURITY INSPECTION AND KIT OF PARTS WITH A DETACHABLE SINGLE-USE INLAY FOR AN X-RAY TRAY

BACKGROUND

Technical Field

This disclosure relates to a method for security inspection of baggage and/or personal items. This disclosure also relates to a kit of parts with a detachable single-use inlay and an X-ray tray of a security check at an airport.

Description of the Related Art

The dangers of pathogenic agents are well known in the art. Airports and railway stations are hubs for spreading various kinds of diseases as many passengers from different locations come in close contact in one place. Passengers usually transfer pathogenic agents directly by person-to-person contact and droplet spread or indirectly by contact with contaminated objects.

WO 2015 041 619 A1 relates to the prevention of the mass spread of infectious microbes at baggage conveyors available in public areas by applying an antibacterial cast and solvent foil on the surfaces of baggage conveyor belts.

Other common measures to avoid a transfer of pathogenic agents include washing hands, wearing gloves or other protection equipment, and regularly wiping surfaces. It was found that some of these measures are difficult to implement during travel and others are not as effective as intended.

BRIEF SUMMARY

The present disclosure aims at decreasing the danger of spreading diseases at airports or other public or private facilities. In various aspects, the disclosure provides improved methods and a kit of parts for preventing an indirect transfer of pathogenic agents. In various aspects, the disclosure also provides methods and a kit of parts that allow a high throughput of passengers in spite of said countermeasures to prevent spreading of pathogenic agents, i.e., said countermeasures are practicable without significant loss of time.

This disclosure relates to a method for security inspection of baggage and/or personal items. Said method comprises:
  a. providing a X-ray tray having a deposition area;
  b. attaching a single-use inlay to said X-ray tray to cover said deposition area, said single-use inlay comprising a paper and/or polymer layer having an outer side and an inner side;
  c. putting the baggage and/or personal items onto the single-use inlay without direct contact to the X-ray tray;
  d. X-ray scanning said baggage and/or personal items disposed in said X-ray tray, wherein the X-ray tray is moved into and out of the scanning area;
  e. removing the baggage and/or personal items from said single-use inlay; and
  f. detaching said single-use inlay from said X-ray tray.

According to some embodiments, the method further comprises:
  g. disposing of said single-use inlay in a waste container, in particular for recycling; and/or
  h. crushing, melting and/or shredding of the single-use inlay, in particular wherein the material of the single-use inlay is recycled.

According to some embodiments of the method, the paper and/or polymer layer is secured to the X-ray tray by stretching it over an edge of said X-ray tray, wherein said paper and/or polymer layer contracts at or below said edge on an exterior side of the X-ray tray.

Hereinafter a kit of parts is described. Although various combinations of single-use inlays and X-ray trays are in principle suitable for the above described method, in various embodiments of the method in step b. the detachable single-use inlay and the X-ray tray is a kit of parts and/or single-use inlay as described hereinafter.

According to some embodiments of the method, said paper and/or polymer layer has an essentially circumferential fringe area adapted to grasp and/or cover the edges of said X-ray tray.

According to some embodiments of the method, said detachable single-use inlay comprises a protective cover and has a compressed state in which the paper and/or polymer layer is compressed within said protective cover as well as a decompressed state, in which the paper and/or polymer layer is decompressed, wherein the single-use inlay is decompressed prior to attachment in accordance with step b.

According to some embodiments of the method said paper and/or polymer layer is a non-adhesive detachable layer that is attachable by stretching said essentially circumferential fringe area over the edges of said X-ray tray.

According to some embodiments of the method, said polymer layer comprises or is a polymer foil made of polyethylene or polypropylene or an ethylene copolymer or a propylene copolymer.

According to some embodiments of the method, said paper and/or polymer layer has an essentially circumferential fringe area that grasps and/or covers the edges of said X-ray tray in step b., and wherein the essentially circumferential fringe area comprises an elastic band and/or the polymer layer is an elastic polymer layer.

According to some embodiments of the method, said paper and/or polymer layer is transparent for X-rays and/or visible light.

According to some embodiments of the method, said method is a method for security inspection of passenger's baggage and/or personal items at an airport.

In accordance with various embodiments of the present disclosure, said kit of parts comprises a detachable single-use inlay and an X-ray tray adapted for a security check at an airport or other public facility or at an private facility, the detachable single-use inlay comprising a paper and/or polymer layer having an outer side and an inner side, wherein the paper and/or polymer layer has an essentially circumferential fringe area adapted to grasp and/or cover the edges of said X-ray tray.

According to some embodiments, the detachable single-use inlay comprises a protective cover and has a compressed state in which the paper and/or polymer layer is compressed within said protective cover, and a decompressed state, in which the paper and/or polymer layer is decompressed.

According to some embodiments, in the compressed state the length and width of the single-use inlay is reduced by at least 50% and/or in the compressed state the length and width of the single-use inlay is smaller than 10 cm.

According to some embodiments, the paper and/or polymer layer is a non-adhesive detachable layer that is attachable by stretching said essentially circumferential fringe area over the edges of said X-ray tray.

According to some embodiments, the paper and/or polymer layer is watertight.

According to some embodiments, the polymer layer comprises or is a polymer foil made of polyethylene or polypropylene.

According to some embodiments, the paper and/or polymer layer has an average material thickness of 10 to 200 µm.

According to some embodiments, the essentially circumferential fringe area comprises an elastic band.

According to some embodiments, the paper and/or polymer layer is coated on the outer and/or inner side with an antibacterial composition and/or an antibacterial composition is part of the material of the paper and/or polymer layer.

According to some embodiments, the paper and/or polymer layer is transparent for X-rays and/or visible light.

DETAILED DESCRIPTION

Figure 1:
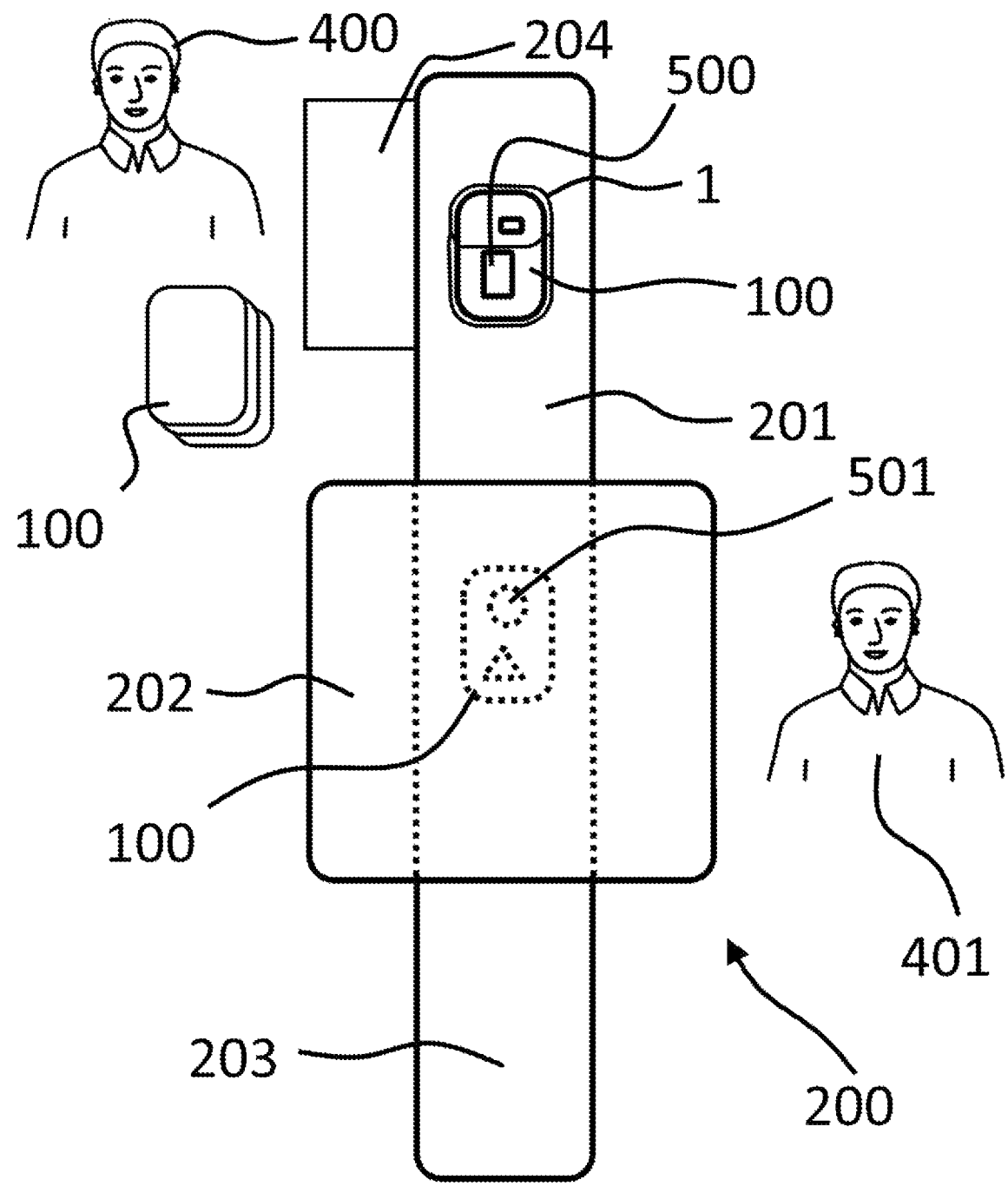
FIG. 1 shows a schematic top down view of a security check at an airport.

Security checks are known in the art, e.g., from airports or when entering a building that contains sensitive information. Often security checks comprise a narrow passage where passengers are scanned. Baggage and/or personal items are usually scanned separately, e. g., using an X-ray scanner of comparatively high intensity. The security check may be a security gate for checking baggage and/or personal items in search for weapons, drugs, bombs or other prohibited items using said X-ray scanner. The present disclosure helps in preventing a transmission of pathogenic agents in this specific field from an X-ray tray to baggage and/or personal items and also from baggage and/or personal items to an X-ray tray.

The disclosure also relates to a method for security inspection of baggage and/or personal items, the method comprising the steps of, in particular in this order:

a. providing an, in particular plastic, X-ray tray having a deposition area;

b. attaching an, in particular disposable, flexible and/or elastic, single-use inlay to said X-ray tray to cover said deposition area, said single-use inlay comprising a paper and/or polymer layer having an outer side and an inner side, in particular wherein the paper and/or polymer layer has an, in particular elastic, essentially circumferential fringe area that grasps and/or covers the edge of said X-ray tray;

c. putting the baggage and/or personal items onto the single-use inlay, in particular without direct contact to the X-ray tray;

d. X-ray scanning said baggage and/or personal items disposed in said X-ray tray, in particular wherein the X-ray tray is moved, in particular, by at least one conveyor into and out of the scanning area;

e. removing the baggage and/or personal items from said single-use inlay;

f. detaching said single-use inlay from said X-ray tray;

g. preferably disposing of said single-use inlay in a waste container, in particular for recycling;

h. preferably crushing, melting and/or shredding of the single-use inlay, in particular wherein the material of the single-use inlay is recycled.

It was found that with the above described single-use inlay, a transfer from bacteria from the X-ray tray commonly used at security checks can be prevented. Said X-ray trays are provided to dispose baggage and/or personal items therein when they are transported, e.g., on a conveyor belt, and scanned using X-ray based scanning machines. Said X-ray trays are touched by hundreds if not thousands of passengers. Shoes are put into said X-ray trays and have pathogenic agents attached to the shoe soles. Multiple personal items, such as used handkerchiefs, money, belts, jackets, tablets, laptops and watches are disposed in said X-ray trays. The result is that said X-ray trays may inevitably be heavily contaminated with pathogenic agents. The detachable single-use inlay may be used to prevent a transfer of pathogenic agents from the X-ray trays to baggage and/or personal items or vice versa. An X-ray tray in accordance with this disclosure relates to a tray for baggage and/or personal items that is used for transporting said baggage and/or personal items through an X-ray based scanning machine, i.e., a tray adapted for an X-ray based scanning process. Often a plastic tray of suitable size is used. Trays made solely out of metal often cannot be used as they may prevent X-ray detection of dangerous items within baggage or dangerous personal items using said X-ray based scanning machine.

In some embodiments of the method, the paper and/or polymer layer is secured to the X-ray tray by stretching it over an, in particular protruding, edge of said X-ray tray, wherein the paper and/or polymer layer preferably contracts at or below said edge, in particular on an exterior side of the X-ray tray. The X-ray tray may be any kind of transport tray suitable for transporting baggage and/or personal items through a X-ray baggage scanner, in particular a plastic transport tray of suitable size for baggage.

In some embodiments, the method is a method for security inspection of passenger's baggage and/or personal items at an airport. It may also be a method for security inspection at an entrance of a school, courthouse, football stadium, soccer stadium, railway station or any other public buildings or areas that may require enhanced security, in particular where there is an increased danger of terrorist attacks and/or where large groups of people come together. It may also be implemented at private facilities, in particular private facilities which are not accessible to the general public.

In some embodiments of the method, after disposing of the single-use inlay, the method comprises the step of crushing, melting and/or shredding of the single-use inlay, in particular wherein the material of the single-use inlay is recycled.

In some embodiments of the method, step e. can include that a security office checks the baggage manually prior to removing said baggage and/or personal items from said single-use inlay. Preferably the inlay stay connected to said x-ray tray during this checking. It is also possible that the baggage and/or personal items is scanned a second time prior to removing said baggage and/or personal items.

According to some embodiments of the method, said paper and/or polymer layer has an essentially circumferential fringe area adapted to grasp and/or cover the edges of said X-ray tray.

According to some embodiments of the method, said detachable single-use inlay comprises a protective cover and has a compressed state in which the paper and/or polymer layer is compressed within said protective cover as well as a decompressed state, in which the paper and/or polymer layer is decompressed, wherein the single-use inlay is decompressed prior to attachment in accordance with step b.

According to some embodiments of the method, said paper and/or polymer layer is a non-adhesive detachable layer that is attachable by stretching said essentially circumferential fringe area over the edges of said X-ray tray.

According to some embodiments of the method, said polymer layer comprises or is a polymer foil made of polyethylene or polypropylene or an ethylene copolymer or a propylene copolymer.

According to some embodiments of the method, said paper and/or polymer layer has an essentially circumferential fringe area that grasps and/or covers the edges of said X-ray tray in step b., and wherein the essentially circumferential fringe area comprises an elastic band and/or the polymer layer is an elastic polymer layer.

According to some embodiments of the method, said paper and/or polymer layer is transparent for X-rays and/or visible light.

According to some embodiments of the method, said method is a method for security inspection of passenger's baggage and/or personal items at an airport.

Hereinafter a kit of parts is described. Although various combinations of single-use inlays and X-ray trays are in principle suitable for the above described method, in various embodiments in step b. the detachable single-use inlay and the X-ray tray is said kit of parts as described hereinafter. It was found that said kit of parts combines well with the method and provides improved results. It should be noted that in step b. the single-use inlay is attached to the X-ray tray. For the kit of parts it is also possible that the single-use inlay may be attached to the X-ray tray. However, it is furthermore possible to provide them separately as kit of parts, wherein the user has to attach the single-use inlay when the kit of parts is made us of for its intended purpose.

The present discloser also relates to a kit of parts that comprises a detachable single-use inlay and an X-ray tray, in particular an X-ray tray adapted for a security check at an airport or other public facility, the detachable single-use inlay comprising an, in particular flexible, paper and/or polymer layer having an outer side and an inner side, in particular wherein the paper and/or polymer layer has an essentially circumferential fringe area adapted to grasp and/or cover the edges of said X-ray tray.

According to some embodiments of said kit of parts, the detachable single-use inlay comprises a protective cover and has a compressed state in which the paper and/or polymer layer is compressed, in particular folded and/or detached from the X-ray tray, within said protective cover, and a decompressed state, in which the paper and/or polymer layer is decompressed, in particular unfolded and/or attached to said X-ray tray. It is in one embodiment of the method envisioned that prior to step b., in particular between step a. and b., the single-use inlay is decompressed in the above described manner.

Said protective cover may also comprise a second paper and/or polymer layer or even a third paper and/or polymer layer. If multiple X-ray trays are made use of, it is beneficial to have more paper and/or polymer layers.

In said compressed state, the length and width of the single-use inlay may be reduced by at least 50%, in particular by at least 75%, preferably by at least 90% compared to its size when expanded. Alternatively or additionally in said compressed state, the length and width may be smaller than 10 cm, preferably smaller than 5 cm. The thickness of said single-use inlay in the compressed state is preferably below 3 cm or even below 1 cm. Compression is usually achieved by folding the paper and/or polymer layer, e.g., a compression of 50% may achieved by folding it once. To achieve a compression of 90%, multiple folding may be necessary. Also size can be reduced by simply crumpling the paper and/or polymer layer. If the length and width of the single-use inlay is referred to, then this means the length and width in its current state, i.e., a single-use inlay comprising a folded paper and/or polymer layer has a smaller length and width than when said paper and/or polymer layer is fully expanded.

Said protective cover of the kit of parts may have substantially rectangular dimensions when the single-use inlay is in the compressed state. The protective cover may be a plastic bag comprising the paper and/or polymer layer, in particular a gastight plastic bag.

In some embodiments of the kit of parts, the protective cover may be attached to the paper and/or polymer layer. This is not always necessary, but may facilitate disposal of said protective cover. Once the single-use inlay is discarded, e.g., in a waste bin for recycling, the protective cover is automatically recycled with the paper and/or polymer layer. In other embodiments, the paper and/or polymer layer is separated from the protective cover and they may be disposed of together or separately.

In some embodiments of the kit of parts, the protective cover is formed from the same material as the paper and/or polymer layer. This is particularly suitable, when recycling of the waste is intended. In said case recycling is facilitated.

In some embodiments of the kit of parts, the entire single-use inlay consists of one single material. Said material may be one of the polymers discussed in this disclosure. It may also be a paper material.

In some embodiments of the kit of parts, the single-use inlay may comprise an imprint, such as a trademark of a producer or a logo.

In some embodiments of the kit of parts in the compressed state, the paper and/or polymer layer is vacuum-packed within the protective cover. This reduces the amount of contamination within the protective cover. Many pathogenic agents need air and/or water to survive and remain infective. Also if the protective cover is opened or a seal of the protective cover is broken, air enters and the vacuum is destroyed. This can be visibly observed by an expansion of the single-use inlay and the surrounding protective cover. The user gets a warning if the single-use inlay is not safe to use any more due to possible contamination of the inner side said single-use inlay.

In some embodiments of the kit of parts in the compressed state, the paper and/or polymer layer is contained in a gastight protective cover. Said gastight protective cover may be used to maintain a vacuum. However, it is also possible to use a gas, e.g., an inert gas or purified pathogen free air, to prevent any contamination of the interior of the protective cover, i.e., of the single-use inlay within the protective cover.

In some embodiments of the kit of parts, the paper and/or polymer layer is a non-adhesive detachable layer that is attachable by stretching said essentially circumferential fringe area over the edges of said X-ray tray. It was found that this provides a quick and secure attachment. If the attachment is not sufficiently secure, there is a danger that the protective cover will detach and the interior may be contaminated by pathogenic agents on the surface of the X-ray tray. Also this way of attachment usually can be applied very fast. At security checks, a high number of people have to be processed and the transfer of baggage and/or personal items within X-ray trays is a bottleneck for the numbers of people that are checked per minute. It is in some situations crucial that the single-use inlay can be applied as fast as possible, i.e., within a few seconds. A similar principle is known from bed sheets, where fitted sheets can be applied faster than regular sheets.

In some embodiments of the kit of parts, the paper and/or polymer layer is a non-textile layer. It may be that the paper and/or polymer layer is a paper layer. Said paper layer may have a thickness of less than 100 μm. Also a polymer layer is possible. Said polymer layer may be an elastic layer. It may also have a thickness of less than 100 μm In some embodiments of the kit of parts, the paper and/or polymer layer is watertight. This prevents a transfer of contaminated liquid form the X-ray tray to the baggage and/or personal items disposed on the single-use inlay.

In some embodiments of the kit of parts, the single-use inlay has an opening. The shape of said opening may be defined by the essentially circumferential fringe area. The opening may be elastic and in some embodiments can change its size to fit over a circumferential edge of said X-ray tray.

In some embodiments of the kit of parts, the single-use inlay may clutch the X-ray tray due to its elastic properties, in particular due to an elastic band and/or an elastic paper and/or polymer layer.

The X-ray trays may, in some embodiments, have a width of 30 to 50 cm and a length of 40 to 60 cm, wherein the length is preferably at least 5 to 10 cm larger than the width. In some embodiments, the height is 6 to 20 cm, in particular 7.5 to 15 cm. The single-use inlay may be adapted to fit multiple sizes, in particular the aforementioned dimensions.

The X-ray tray may contain an RFID card.

The X-ray tray may be injection-molded.

The X-ray tray may consist to at least 90% (w/w), in particular to at least 95% (w/w), of a polymer composition. In some embodiments, polypropylene is a preferred material for said X-ray tray.

In some embodiments of the kit of parts, the polymer layer comprises or is a polymer foil made of polyethylene or polypropylene, preferably chlorinated polyethylene or chlorinated polypropylene.

In some embodiments of the kit of parts, the single-use inlay may have a total weight of less than 100 g, in particular less than 25 g, preferably less than 10 g. It was found that very little material is required for a sufficient protection barrier.

In some embodiments of the kit of parts, the paper and/or polymer layer may have an average material thickness of 10 to 200 μm, preferably of 20 to 100 μm, particularly preferred of 30 to 70 μm.

In some embodiments of the kit of parts, the essentially circumferential fringe area comprises an elastic band. The elastic band may comprise the same material as the polymer layer. It also may be made from latex or any other suitable material. Said elastic band may be used to ensure a tight grasp at or below the edges of the X-ray tray.

In some embodiments of the kit of parts, the paper and/or polymer layer is coated on the outer and/or inner side, in particular on the inner side, with an antibacterial composition and/or an antibacterial composition is part of the material of the paper and/or polymer layer.

In some embodiments, the paper and/or polymer layer may be transparent for X-rays. A transparency for X-ray helps in recognizing and scanning of baggage and/or personal items within the single-use inlay.

Alternatively or additionally the paper and/or polymer layer may the transparent for visible light. This helps a security office to verify that no hidden objects are arranged below the single-use inlay.

In some embodiments of the kit of parts, the single-use inlay is made of at least 90% (w/w), in particular of at least 95% % (w/w), of a flexible film material, in particular the polymer or/paper layer. It may be that the single-use inlay is made of at least 90% (w/w), in particular of at least 95% % (w/w), of said polymer film, wherein the polymer film is a flexible polymer film. It may also be that the single-use inlay is made up entirely from said flexible film material, in particular said polymer and/or paper layer.

In some embodiments of the kit of parts, the single-use inlay is single-layered or comprises an area that constitutes at least 55% of the total area of the single-use inlay that is single-layered. The essentially circumferential fringe area may also surround a single-layered area of the single-use inlay, wherein the essentially circumferential fringe area may be single layered as well or may have more than one layer.

In some embodiments of the kit of parts, the single-use inlay has an outer side and/or inner side that is skid-resistant. Said outer side and/or inner side may comprise patterns or grooves, e.g., a diamond pattern or concentric grooves.

Various embodiments of the kit of parts were described above. However, the disclosure also relates to a single-use inlay as described above as such, i.e., without the X-ray tray as comprised in said kit of parts. The present disclosure relates to a detachable single-use inlay for an X-ray tray of a security check at an airport or other public facility, comprising an, in particular flexible, paper and/or polymer layer having an outer side and an inner side, wherein the paper and/or polymer layer has an essentially circumferential fringe area adapted to grasp and/or cover the edges of said X-ray tray. Said single-use inlays may be provided in packages of 50 to 10,000 units, e.g., transport boxes, wherein said boxes have an oval, rectangular or circular opening in at least one side through which the single-use inlays may be removed.

The disclosure also relates to the use of a single-use inlay as described above to prevent the transfer of pathogenic agents from an X-ray tray of a security check to baggage and/or personal items. In one embodiment of the above described method, the single-use inlay as described above to prevents the transfer of pathogenic agents from an X-ray tray of a security check to baggage and/or personal items.

The disclosure also relates to the use of a single-use inlay as described above to during X-ray screening in an airport of baggage and/or personal items disposed in the X-ray tray on the single-use inlay, in particular when used to prevent the transfer of pathogenic agents from an X-ray tray of a security check to baggage and/or personal items.

FIG. 1 shows a schematic view of a security check 200 at an airport. A passenger 400 may take an X-ray tray 100 from a staple, places it on the desk 204 and attach the single-use inlay 1. FIG. 1 shows the situation of the next step, wherein the X-ray tray 100 with the attached single-use inlay 1 and containing personal items 500 on said inlay 1 is placed on the conveyor belt 201 that goes into the X-ray baggage scanner 202. A security officer 401 scans another X-ray tray 100 comprising baggage 501 using X-rays. The single-use inlay is not visible as X-rays are not impeded by the single-use inlay of this embodiment. A leaving conveyor belt 203 may transport each X-ray tray 100 out of said X-ray baggage scanner.

Figure 2:
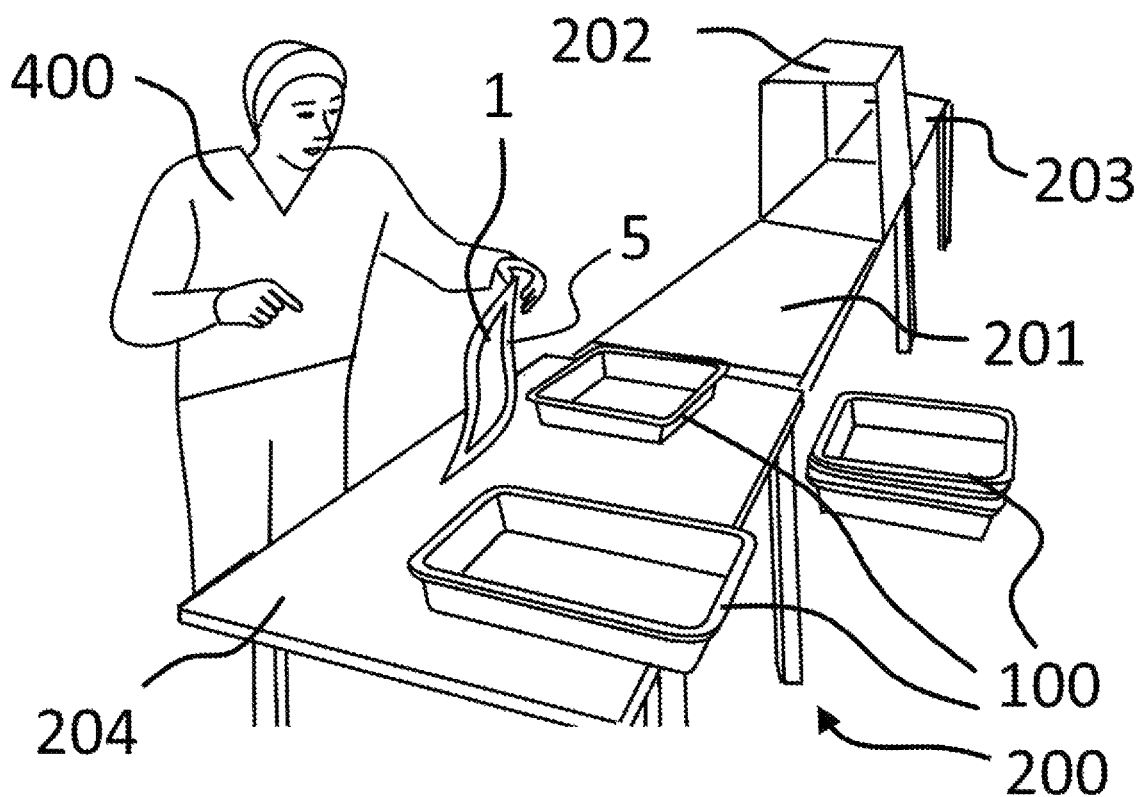
FIG. 2 shows a user who applies the detachable single-use inlay at a security check.
Figure 7:
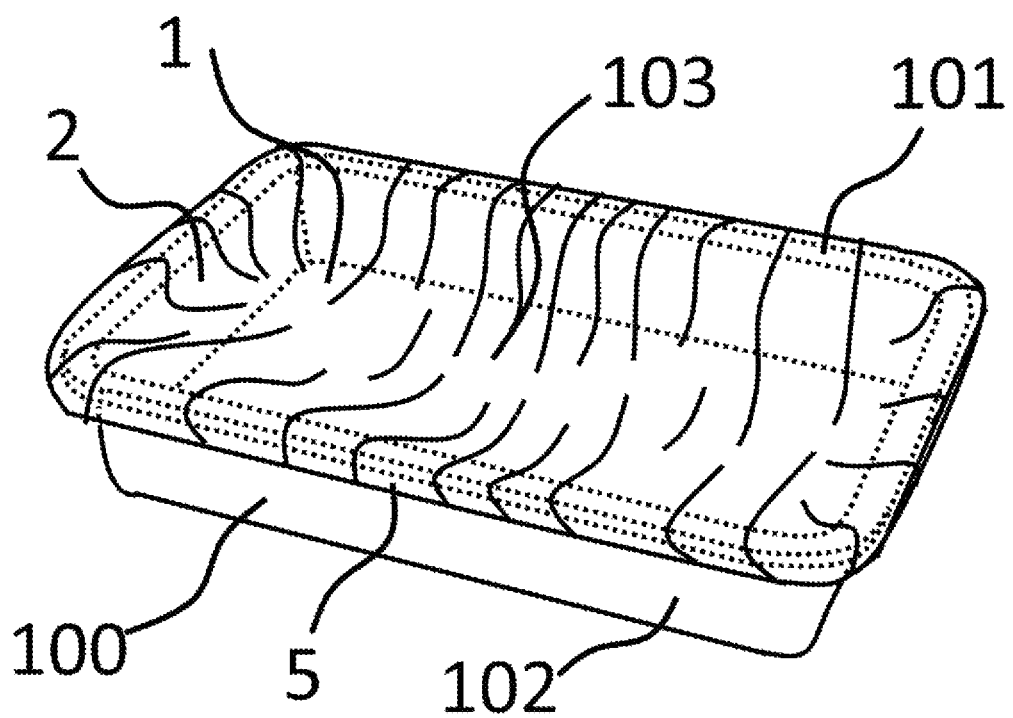
FIG. 7 shows a perspective view of an embodiment of a detachable single-use inlay attached to X-ray tray as used at a security check at an airport.

FIG. 2 shows a perspective view of a security check 200 at an airport, wherein a passenger 400 is shown, who starts to attach a single-use inlay 1 having an essentially circumferential fringe area 5 to the foremost X-ray tray 100. During this procedure, the X-ray tray 100 may be placed on a table 204. Once the single-use inlay 1 is attached and baggage and/or personal items have been filled into the X-ray tray 100, it is transported through the X-ray baggage scanner 202 using conveyor belts 201 and 203. In FIG. 7 it can be seen how the single-use inlay 1 looks like once it has been attached by said passenger 400.

Figure 3:
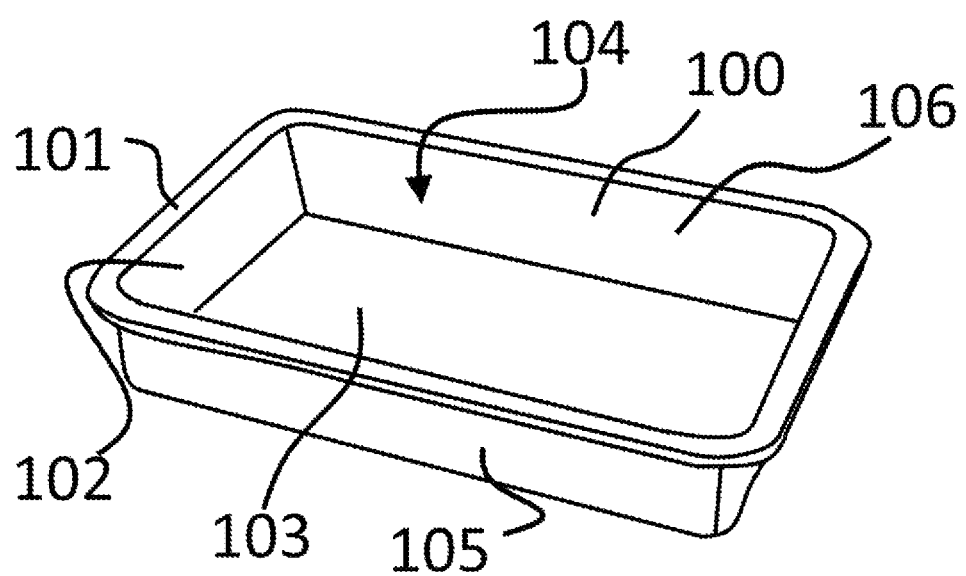
FIG. 3 shows a perspective view of an X-ray tray as used at a security check at an airport.

FIG. 3 shows a perspective view of an X-ray tray 100 having side walls 102, a bottom 103 and a protruding circumferential edge 101. Said side walls 102 and the bottom 103 define a deposition area 104. The X-ray tray 100 has an exterior side 105 and an interior side 106.

Figure 4:
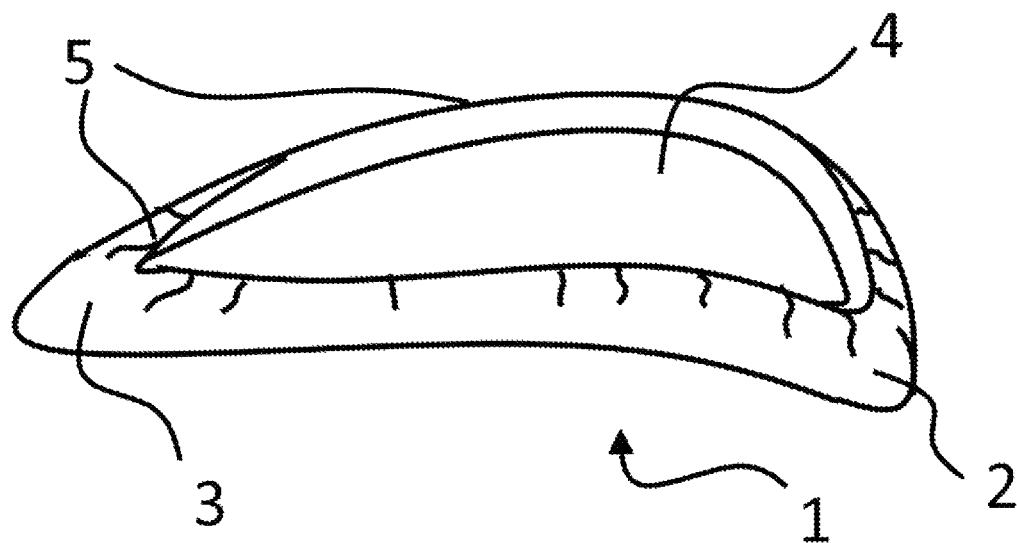
FIG. 4 shows a perspective view of an embodiment of a detachable single-use inlay.

FIG. 4 shows a perspective view of a single-use inlay 1 which is decompressed and detached from any X-ray tray. Said detachable single-use inlay 1 for an X-ray tray comprises a polymer layer 2 having an outer side 3 and an inner side 4, wherein the polymer layer 2 has an essentially circumferential fringe area 5 adapted to grasp and/or cover the edges of an X-ray tray as shown in FIG. 3. This embodiment may comprise an elastic polymer layer.

Figure 5:
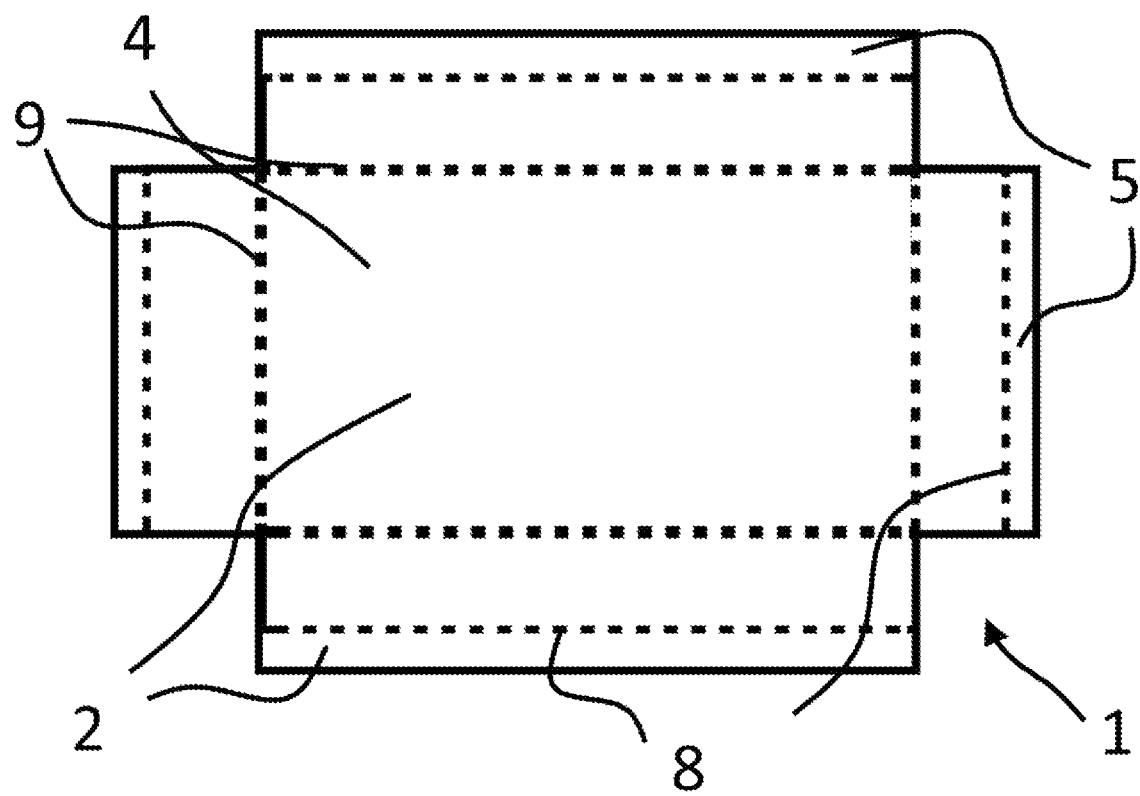
FIG. 5 shows a schematic view of another embodiment of a detachable single-use inlay.

FIG. 5 shows a schematic view of a single-use inlay which is decompressed and detached from any X-ray tray. Said detachable single-use inlay 1 for an X-ray tray comprises a paper layer 2 having an outer side (not shown) and an opposing inner side 4, wherein the paper layer 2 has an essentially circumferential fringe area 5 adapted to grasp and/or cover the edges of an X-ray tray as shown in FIG. 3. Within the embodiment of FIG. 5, folding lines 9 separate the bottom from the side walls and folding lines 8 define the essentially circumferential fringe area 5. This embodiment is non-elastic.

Figure 6:
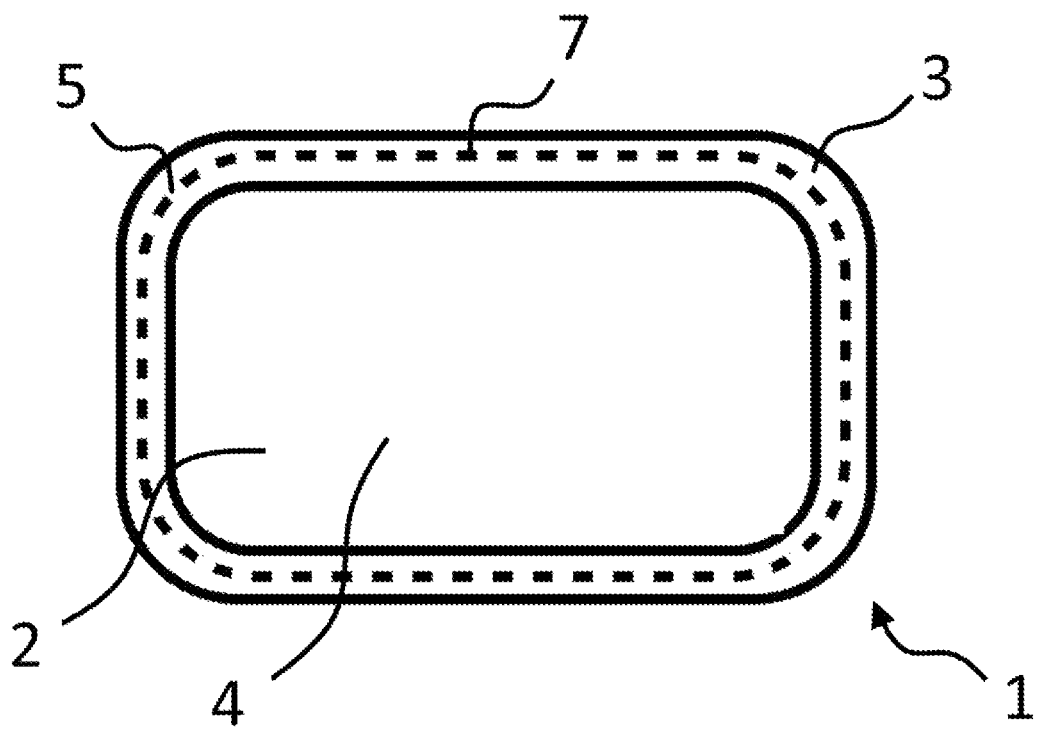
FIG. 6 shows a schematic view of another embodiment of a detachable single-use inlay.

FIG. 6 shows a schematic view of a single-use inlay 1 which is decompressed and detached from any X-ray tray. Said detachable single-use inlay 1 for an X-ray tray comprises a polymer layer 2 having an outer side 3 and an inner side 4, wherein the polymer layer 2 has an essentially circumferential fringe area 5 adapted to grasp and/or cover the edges of an X-ray tray as shown in FIG. 3. Said essentially circumferential fringe area 5 comprises an elastic band 7, which is integrated into the fringe area.

FIG. 7 shows a perspective view of a detachable single-use inlay 1 within an X-ray tray 100, wherein the polymer layer 2 has an essentially circumferential fringe area 5 that grasps and covers the edge 101 of said X-ray tray 100. Said X-ray tray 100 has side walls 102, a bottom 103 and a protruding circumferential edge 101.

Figure 8:
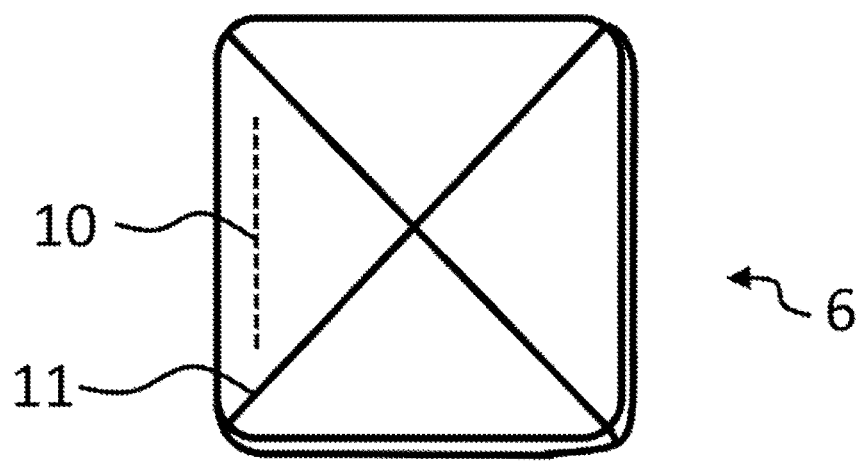
FIG. 8 shows a schematic view of a compressed state in which the paper and/or polymer layer is compressed within an protective cover.

FIG. 8 shows a perspective view of a protective cover 6 in which the paper and/or polymer layer of the single-use inlay 1 may be folded or crumpled in a compressed state, e.g., compressed by removing all air from within the protective cover 6. The protective cover 6 may be a bag containing the paper and/or polymer layer on the inside. The protective cover 6 may comprise welding seams 11. It may also comprise weakened zones 10 for opening the protective cover 6.

Figure 9:
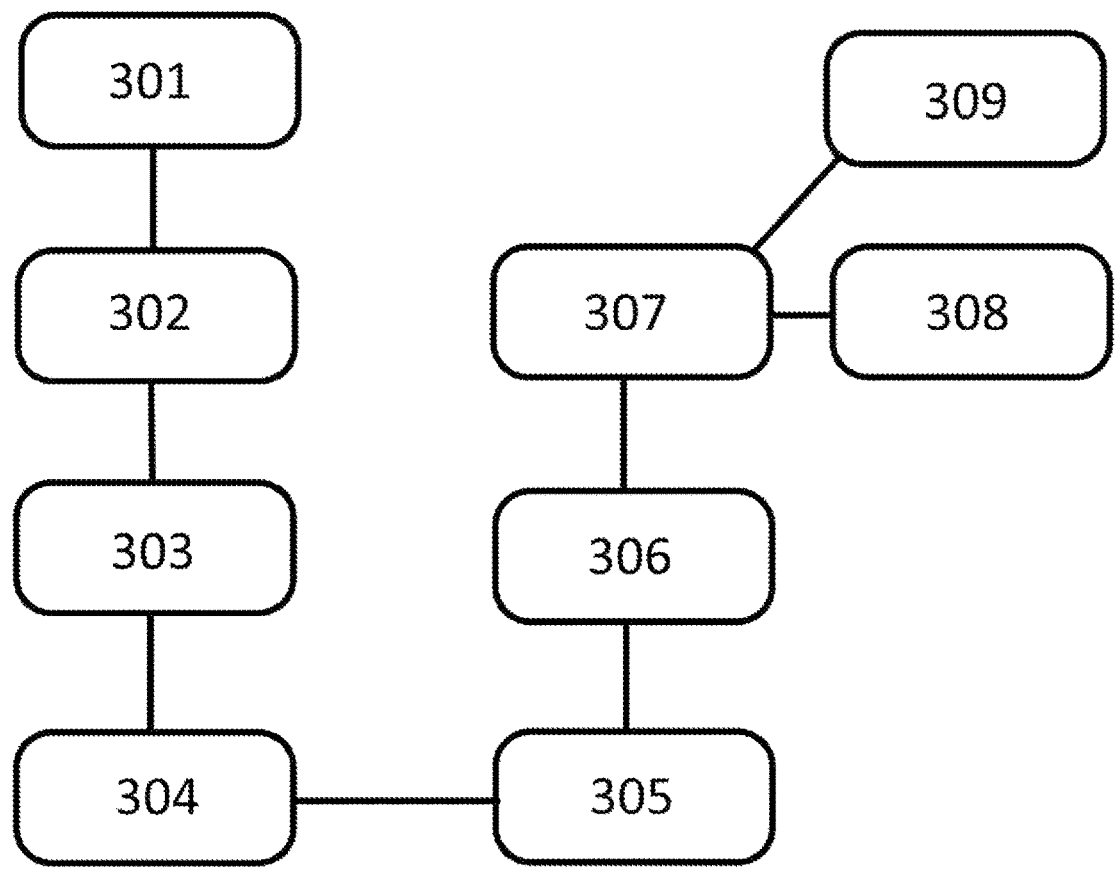
FIG. 9 shows a schematic view of the method for security inspection of baggage and/or personal items.

FIG. 9 shows a schematic view of the method for security inspection of baggage and/or personal items according to the disclosure. Said method comprises the steps of 301 providing an X-ray tray having a deposition area; 302 attaching a single-use inlay to said X-ray tray to cover said deposition area, 303 putting the baggage and/or personal items onto the single-use inlay, in particular without direct contact to the X-ray tray; 304 X-ray scanning said baggage and/or personal items disposed in said X-ray tray, wherein the X-ray tray is moved by at least one conveyor, e.g., a belt conveyor, into and out of the scanning area; 305 removing the baggage and/or personal items from said single-use inlay; 306 detaching said single-use inlay from the X-ray tray; 307 disposing of said single-use inlay, in particular in a waste container; and 308 burning said single-use inlay or 309 recycling said single-use inlay.

The features of the disclosure disclosed in the above description, the claims and the drawings can be essential, both individually and in any combination, to implement the disclosure in its various embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for security inspection of baggage and/or personal items, the method comprising:
   a. providing an X-ray tray having a deposition area;
   b. attaching a single-use inlay to said X-ray tray to cover said deposition area, said single-use inlay comprising a paper and/or polymer layer having an outer side and an inner side;
   c. putting the baggage and/or personal items onto the single-use inlay without direct contact to the X-ray tray;
   d. X-ray scanning said baggage and/or personal items disposed in said X-ray tray, wherein the X-ray tray is moved into and out of the scanning area;
   e. removing the baggage and/or personal items from said single-use inlay; and
   f. detaching said single-use inlay from said X-ray tray,
   wherein said single-use inlay comprises a protective cover and has a compressed state in which the paper and/or polymer layer is compressed within said protective cover, as well as a decompressed state in which the paper and/or polymer layer is decompressed, and
   wherein said single-use inlay is decompressed prior to attachment in accordance with step b.

2. The method for security inspection according to claim 1, wherein the paper and/or polymer layer is secured to the X-ray tray by stretching it over an edge of said X-ray tray, wherein the paper and/or polymer layer contracts at or below said edge on an exterior side of the X-ray tray.

3. The method for security inspection according to claim 1, wherein the method further comprises:
   g. disposing of said single-use inlay in a waste container; and/or h. crushing, melting and/or shredding of the single-use inlay, in particular wherein the material of the single-use inlay is recycled.

4. The method for security inspection according to claim 1, wherein said paper and/or polymer layer has an essentially circumferential fringe area adapted to grasp and/or cover the edges of said X-ray tray.

5. The method for security inspection according to claim 1, wherein said paper and/or polymer layer is a non-adhesive detachable layer that is attachable by stretching said essentially circumferential fringe area over the edges of said X-ray tray.

6. The method for security inspection according to claim 1, wherein said polymer layer comprises or is a polymer foil made of polyethylene or polypropylene or an ethylene copolymer or a propylene copolymer.

7. The method for security inspection according to claim 1, wherein said paper and/or polymer layer has an essentially circumferential fringe area that grasps and/or covers the edges of said X-ray tray in step b., and wherein the essentially circumferential fringe area comprises an elastic band and/or the polymer layer is an elastic polymer layer.

8. A method for security inspection of baggage and/or personal items, the method comprising:
   a. providing an X-ray tray having a deposition area;
   b. attaching a single-use inlay to said X-ray tray to cover said deposition area, said single-use inlay comprising a paper and/or polymer layer having an outer side and an inner side;
   c. putting the baggage and/or personal items onto the single-use inlay without direct contact to the X-ray tray;
   d. X-ray scanning said baggage and/or personal items disposed in said X-ray tray, wherein the X-ray tray is moved into and out of the scanning area;
   e. removing the baggage and/or personal items from said single-use inlay; and
   f. detaching said single-use inlay from said X-ray tray, wherein said paper and/or polymer layer is transparent for X-rays and/or visible light.

9. The method for security inspection according to claim 8, wherein the paper and/or polymer layer is secured to the X-ray tray by stretching it over an edge of said X-ray tray, wherein the paper and/or polymer layer contracts at or below said edge on an exterior side of said X-ray tray.

10. The method for security inspection according to claim 1, wherein said method is a method for security inspection of passenger's baggage and/or personal items at an airport.

11. A kit of parts comprising a detachable single-use inlay and an X-ray tray adapted for a security check at an airport or other public or private facility, said detachable single-use inlay comprising a paper and/or polymer layer having an outer side and an inner side, wherein said paper and/or polymer layer has an essentially circumferential fringe area adapted to grasp and/or cover the edges of said X-ray tray,
wherein said detachable single-use inlay comprises a protective cover and has a compressed state in which the paper and/or polymer layer is compressed within said protective cover, as well as a decompressed state in which the paper and/or polymer layer is decompressed.

12. The kit of parts according to claim 11, wherein in the compressed state the length and width of said single-use inlay is reduced by at least 50% and/or wherein in the compressed state the length and width is smaller than 10 cm.

13. The kit of parts according to claim 11, wherein said paper and/or polymer layer is a non-adhesive detachable layer that is attachable by stretching said essentially circumferential fringe area over the edges of said X-ray tray.

14. The kit of parts according to claim 11, wherein said paper and/or polymer layer is watertight.

15. The kit of parts according to claim 11, wherein said polymer layer comprises or is a polymer foil made of polyethylene or polypropylene or an ethylene copolymer or a propylene copolymer.

16. The kit of parts according to claim 11, wherein said paper and/or polymer layer has an average material thickness of 10 to 200 µm.

17. The kit of parts according to claim 11, wherein said essentially circumferential fringe area comprises an elastic band and/or the polymer layer is an elastic polymer layer.

18. The kit of parts according to claim 11, wherein said paper and/or polymer layer is coated on the outer and/or inner side with an antibacterial composition and/or wherein an antibacterial composition is part of the material of the paper and/or polymer layer.

19. A kit of parts comprising a detachable single-use inlay and an X-ray tray adapted for a security check at an airport or other public or private facility, said detachable single-use inlay comprising a paper and/or polymer layer having an outer side and an inner side, wherein said paper and/or polymer layer has an essentially circumferential fringe area adapted to grasp and/or cover the edges of said X-ray tray,
wherein said paper and/or polymer layer is transparent for X-rays and/or visible light.

20. The kit of parts according to claim 19, wherein said paper and/or polymer layer is a non-adhesive detachable layer that is attachable by stretching said essentially circumferential fringe area over the edges of said X-ray tray.

* * * * *